United States Patent
Shao et al.

(10) Patent No.: US 6,216,461 B1
(45) Date of Patent: Apr. 17, 2001

(54) EGR DELIVERY AND CONTROL SYSTEM USING DEDICATED FULL AUTHORITY COMPRESSOR

(75) Inventors: Josh S. Shao; Long Kung Hwang; Paul R. Miller; Stephen J. Charlton, all of Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/663,090

(22) Filed: Sep. 15, 2000

Related U.S. Application Data

(62) Division of application No. 08/925,579, filed on Sep. 8, 1997, now Pat. No. 6,164,071.

(51) Int. Cl.$^7$ ................................................. F02M 25/07
(52) U.S. Cl. .................................. 60/605.2; 123/568.12; 123/568.21
(58) Field of Search .................. 123/568.11, 568.12, 123/568.21; 60/605.2

(56) References Cited

U.S. PATENT DOCUMENTS

| | | | |
|---|---|---|---|
| 4,373,498 | * | 2/1983 | Ushimura ........................ 123/568.21 |
| 5,657,630 | * | 8/1997 | Kjemtrup et al. ................... 60/605.2 |
| 5,771,868 | * | 6/1998 | Khair ................................. 60/605.2 |
| 5,791,146 | * | 8/1998 | Dungner ............................. 60/605.2 |
| 5,794,445 | * | 8/1998 | Dungner ............................. 60/605.2 |
| 5,937,650 | * | 8/1999 | Arnold ............................... 60/605.2 |
| 5,937,651 | * | 8/1999 | Braun et al. ....................... 60/605.2 |

FOREIGN PATENT DOCUMENTS 5-71426 * 3/1993 (JP) ..................................... 60/605.2

* cited by examiner

*Primary Examiner*—Willis R. Wolfe
(74) *Attorney, Agent, or Firm*—Leydig, Voit & Mayer, Ltd.

(57) ABSTRACT

An exhaust gas recirculation and control system is provided for an internal combustion engine, wherein a portion of engine exhaust gas flow is recirculated through an EGR duct to engine intake air. The recirculated exhaust gas is pumped through the EGR duct by an EGR compressor driven by a dedicated EGR drive that is independently controllable. Because the EGR drive is independently powered and controlled, the EGR flow rate capacity of the system is not dictated by, or limited, by factors such as engine exhaust flow rate. A controller modulates power delivery to the drive means in response to at least one operating condition parameter in order to achieve a desired EGR flow rate. In order to further optimize efficiency, the EGR compressor is preferably a discrete displacement pump which is controllably drivable in a pulse-capture mode, wherein each intake of the EGR compressor is timed synchronously with exhaust pulses in the exhaust manifold.

14 Claims, 5 Drawing Sheets

EGR DELIVERY AND CONTROL SYSTEM USING DEDICATED FULL AUTHORITY COMPRESSOR

CROSS-REFERENCE TO RELATED APPLICATION

This is a divisional of U.S. patent application Ser. No. 08/925,579, filed now U.S. Pat. No. 6,164,071.

FIELD OF THE INVENTION

The present invention generally relates to internal combustion engines and more particularly relates to an exhaust gas recirculation system for an internal combustion engine having a charged intake.

BACKGROUND OF THE INVENTION

In internal combustion engines, a process known as exhaust gas recirculation ("EGR") is used to reduce $NO_x$ emissions. In general, EGR involves routing a portion of exhaust gas back into the intake air flow. In an engine wherein exhaust backpressure is greater than the intake air pressure (e.g., most normally aspirated engines) an EGR flow can be realized simply by connecting a conduit between the exhaust and the intake ducts. Because of the negative pressure differential, the flow from the exhaust manifold is drawn to the lower pressure of the intake. However, in an engine having a charged intake, an unfavorable pressure differential must be overcome.

More particularly, in turbocharged diesel engines, the recirculated exhaust gas flow is typically introduced into the intake downstream of turbo-compressor and intercooler components in order to avoid degradation of these components. Unfortunately, the intake air is pressurized at this location, presenting an unfavorable intake-to-exhaust manifold pressure.ratio for transporting EGR gases. Diesel engines with efficient, well-matched turbochargers have an insufficient exhaust-to-intake manifold pressure differential during virtually all operating states to induce useful amounts of EGR.

Various EGR systems are known which attempt to overcome this unfavorable pressure differential. One known system provides a pump or compressor that creates a pressure differential sufficient to force the desired exhaust-to-intake flow from the exhaust stack into the intake manifold. However, this requires a significant amount of energy to pump the exhaust from a low or near-zero gauge pressure up to more than the intake manifold pressure. As a result, these known devices tend to substantially sacrifice fuel economy.

An EGR system for a turbocharged engine is disclosed in U.S. Pat. No. 5,564,275 in which exhaust gas flow is drawn from upstream of the exhaust turbine and pumped to the intake by a separate EGR turbocompressor that is driven by a separate branch of the exhaust. A rate of EGR flow is adjustable by a control valve located in that exhaust flow branch driving the EGR turbine. This exhaust-driven type of EGR compressor system can have a response lag from spooling the EGR turbocompressor. Moreover, such a system produces an EGR flow which is limited in capacity, because its pumping capacity is directly dependent on the engine exhaust flow rate.

A need exists for an EGR system which is fuel efficient and which is capable of producing a desired amount of EGR flow on demand.

SUMMARY OF THE INVENTION

The present invention overcomes the problems with the prior art by providing an improved exhaust gas recirculation delivery and control system using a dedicated full authority EGR compressor which is positively driven in an independently controllable manner. The EGR compressor is driven by an independent EGR drive which is controllable to provide a desired output on demand and not limited by an operating condition of the engine, such as exhaust flow rate. This provides greater control and versatility over prior art EGR systems which do not provide independent control of the EGR drive, such as a turbine-powered EGR compressor whose output is directly dependent on the exhaust pressure and flow rate of the engine. This independence of EGR flow rate from engine pressure differential makes the present invention most desirable from an economy point of view.

Specifically, the invention provides a system for use in a diesel engine to draw exhaust gas from upstream of a turbine and pass it through an EGR cooler to lower the gas temperature. The cooled EGR gas is then compressed by a dedicated EGR compressor which delivers it into the fresh, compressed aftercooled intake air stream between an intercooler and an intake manifold. The system of the invention draws exhaust gas from the exhaust manifold instead of the lower-pressure exhaust gas downstream of the exhaust turbine, thereby dramatically reducing an amount of pumping energy needed to deliver the EGR flow. According to the invention, the EGR compressor is driven by a dedicated drive such as an electric motor, hydraulic motor, pneumatic motor, or a variable-ratio coupling between the engine crankshaft and the EGR compressor via a variably controllable transmission means.

The EGR flow rate output of the EGR compressor, and hence a desired intake charge composition, is controlled by a corresponding controller which modulates power delivery to the EGR compressor. For example, in various embodiments of the invention, the controller modulates (1) the voltage delivered to the electric motor EGR drive, (2) air supply to the pneumatic motor EGR drive, (3) hydraulic fluid flow to the hydraulic motor EGR drive, or (4) a variable coupling means varying the transmission of mechanical rotational force from the crankshaft to the EGR compressor. Modulating the drive energy delivery to the EGR compressor drive allows the system to provide full authority control or metering of EGR flow. Moreover, the system can provide a desired amount of EGR flow on demand because the EGR compressor is independently powered and controlled. The EGR drive according to the invention is advantageously not limited in driving capacity by engine operating states, unlike prior art turbine-powered EGR drives which are dependent on exhaust pressure and flow rate.

In order to optimize transient torque response or in engine operating conditions where EGR is unnecessary or may adversely effect the engine system, the EGR delivery system includes a shut-off valve operable to turn off flow through the EGR duct.

An advantage of the present invention is that it provides an EGR system which is economical and versatile. Another advantage of the invention is that it is fuel efficient. A further advantage of the present invention is that it provides an improved system for reducing $NO_x$ emission output, which is regulated in most parts of the world. Furthermore, the EGR system of the invention eliminates the need for a second EGR cooler to transfer away heat from compression, had the EGR been drawn from downstream of the exhaust turbine.

Additional features and advantages of the present invention are described in, and will be apparent from, the disclosure, drawings, and claims.

BRIEF DESCRIPTION OF THE DRAWINGS

FIG. 5 illustrates an intake stage and FIG. 6 illustrates an exhaust stage.

DETAILED DESCRIPTION OF THE PREFERRED EMBODIMENTS

Figure 1:
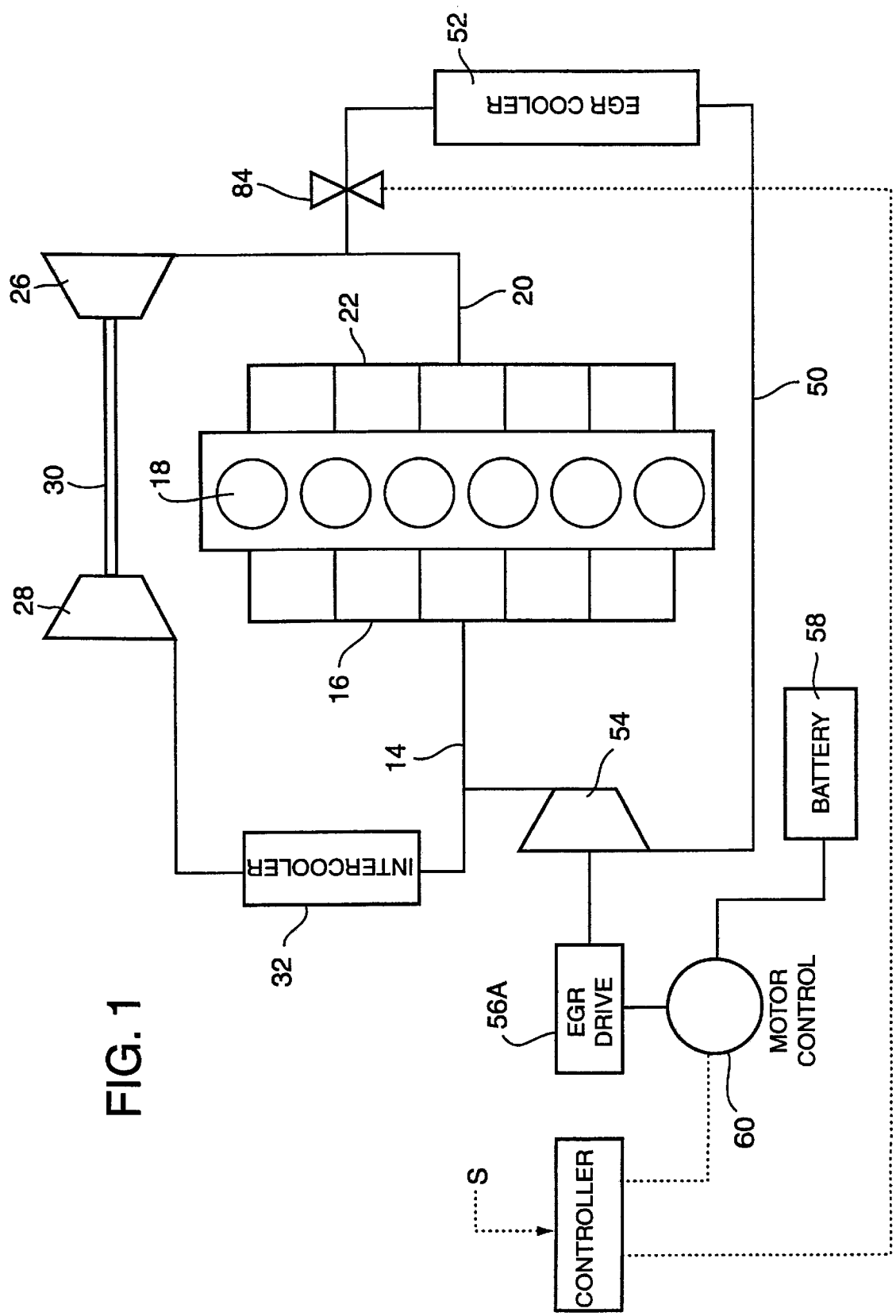
FIG. 1 is a schematic view of an EGR system constructed according to teachings of the invention having an EGR drive which is an electric motor.

Now referring to the drawings, wherein like numerals designate like parts, FIGS. 1–4 illustrate various embodiments of an EGR system 10A–D, respectively, according to the present invention providing exhaust gas recirculation for an internal combustion engine 12. In each of these systems, the engine 12 includes an intake duct 14 having an intake manifold 16 delivering a flow of intake air to the engine cylinders 18 and an exhaust duct 20 having an exhaust manifold 22 carrying a flow of exhaust gas away from the cylinders 18. In general, the EGR system 10A–D carries an EGR flow from the exhaust duct 20 back to the intake duct 14.

As illustrated in FIGS. 1–4, the engine 12 includes a turbocharger 24 for compressing the intake air in a conventional manner. The turbocharger 24 has an exhaust turbine 26 located in the exhaust duct 20 and is driven by the main exhaust flow. The exhaust turbine 26 drives an intake compressor 28 via a common shaft 30. The intake compressor 28 is located in the intake duct 14 to compress the intake air. A heat exchanger or intercooler 32 is located in the intake duct 14 downstream of the intake compressor 28 to cool the compressed intake air.

To facilitate the EGR flow, the EGR system 10A–D includes an EGR duct 50 is connected in communication with the exhaust duct 20 to draw a portion of the exhaust gas for recirculation. Accordingly, the EGR duct 50 is connected to the exhaust duct 20 upstream of the turbine 26, where the exhaust backpressure is greatest. An opposite end of the EGR duct 50 is connected to the intake duct 14 downstream of intercooler 32. As the exhaust gas flows through the EGR duct, it passes through an EGR cooler 52 to lower its temperature to around 250–300° F.

According to the invention, exhaust gas is pumped through the EGR duct 50 by use of an independently driven EGR compressor 54, forcing the EGR flow to the intake duct 14 where the stream of exhaust gas mixes with the compressed fresh intake air to be combusted. More specifically, this EGR compressor 54 is driven by a dedicated EGR drive that is controllable to vary EGR flow independently of engine speed, exhaust flow rate, etc. The various EGR systems 10A–D (FIGS. 1–4, respectively provide that the dedicated EGR drive can include, for example, an electric motor EGR drive 56A (FIG. 1), a pneumatic motor EGR drive 56B (FIG. 2), a hydraulic motor EGR drive 56C (FIG. 3), or a crankshaft coupling EGR drive 56D having a variable transmission (FIG. 4).

Furthermore, the EGR system 10A–D additionally includes an intake charge composition controller 58 operably connected with the EGR drive 56A–D, respectively, to modulate power delivery to the EGR drive and thereby control an EGR flow rate through the EGR duct 50. The controller 58 modulates the EGR output of the compressor in response to various input parameters. For example, the engine 12 may be provided with a variety of sensors, each of which provides a signal to indicate a particular operating parameter. The controller 58 may use one or more of these inputs to modulate the EGR drive 56A–D as necessary to achieve a desired EGR flow rate, and more particularly to achieve a desired intake composition in the intake manifold 14 as necessary to suit particular engine operating conditions. For example, sensors may provide control input signals S indicating engine speed, fuel demand rate, actual fueling rate, mass airflow, turbocharger speed, intake manifold pressure, intake manifold temperature, exhaust manifold temperature, and coolant temperature. Additionally, for closed-loop operation, the signal S preferably also includes an appropriate feedback signal corresponding to the operation of the EGR drive or EGR compressor, such as a signal indicating drive speed of the drive or compressor, position of the EGR drive or EGR compressor, EGR flow rate, or another suitable signal indicating the output of the EGR system.

The controller 58 may utilize various appropriate means to determine conditions and adjust the speed of the EGR drive in response to the input signals S. For example, the controller 58 can apply values of the various input signals to a lookup table which provides an output signal with a value corresponding to a desired EGR drive speed, etc. Also, the controller 58 can process the input signals S through application of an appropriate algorithm to achieve a desired EGR output for given input conditions.

The controller 58 may apply suitable flow models or performance models to determine a desired EGR drive rate for given input data carried in the signal S. For example, a flow model may be provided apply known plumbing or performance data to measured input data such as intake and exhaust pressures, flow temperatures, and determine a desired EGR drive adjustment. By the use of such models, the controller 58 can be adapted to operate the EGR systems 10A, 10B, 10C, 10D with great flexibility for many types of inputs to achieve desired EGR system performance.

In one embodiment, the controller 58 may be a logical partition of a main engine control module ("ECM") (not shown). The aforementioned sensor signals S may be transmitted to the ECM in a conventional manner, and the ECM communicates the necessary information to the partition functioning as the EGR controller.

Referring to FIG. 1, wherein the EGR drive 56A is an electric motor, the EGR drive 56A is powered by the electrical system of the engine 12, having a battery 58 that is charged by a conventional alternator (not shown). In association with such an electric embodiment, a motor control 60 is provided to modulate the electrical power supplied to the EGR drive 56A in response to a control signal from the controller 58, thereby controlling the output of the EGR compressor 54. The motor control 60 may be, for example, an appropriate control circuit containing high-current electronic driver circuitry.

Figure 2:
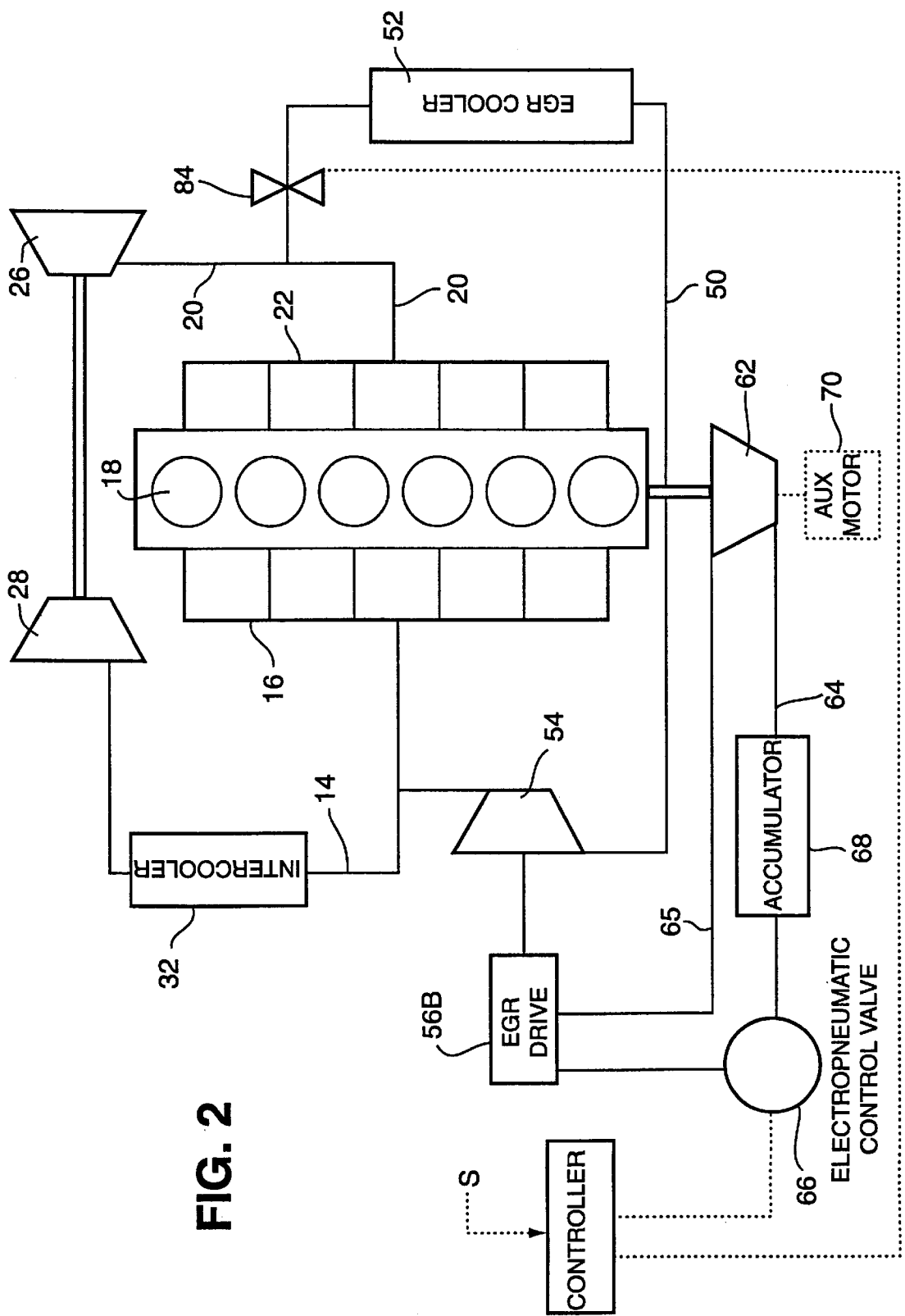
FIG. 2 is a schematic view of an EGR system constructed according to teachings of the invention having an EGR drive which is a pneumatic motor.

Turning to FIG. 2, the EGR drive 56B is a pneumatic motor powered by a compressed air medium. Accordingly, an air compressor 62 is provided to supply this air medium through a drive air duct 64. An electropneumatic control valve 66 is located in the drive air duct 64 to modulate the rate of drive air supplied to the EGR drive 56B in response to a signal from the controller 58, controlling a desired output of the EGR compressor 54. Additionally, an air accumulator 68 is located in the drive air duct 64. Air returns to the air compressor 62 from the EGR drive 56B through a return conduit 65.

The air compressor 62 may be a standard air compressor used to provide air for other applications, such as brakes, etc. The air compressor 62 may be mechanically coupled to the engine crankshaft by an appropriate means (e.g., a belt, chain, gears, etc.) or may be optionally driven by an auxiliary power source, such as a suitable auxiliary motor 70.

Figure 3:
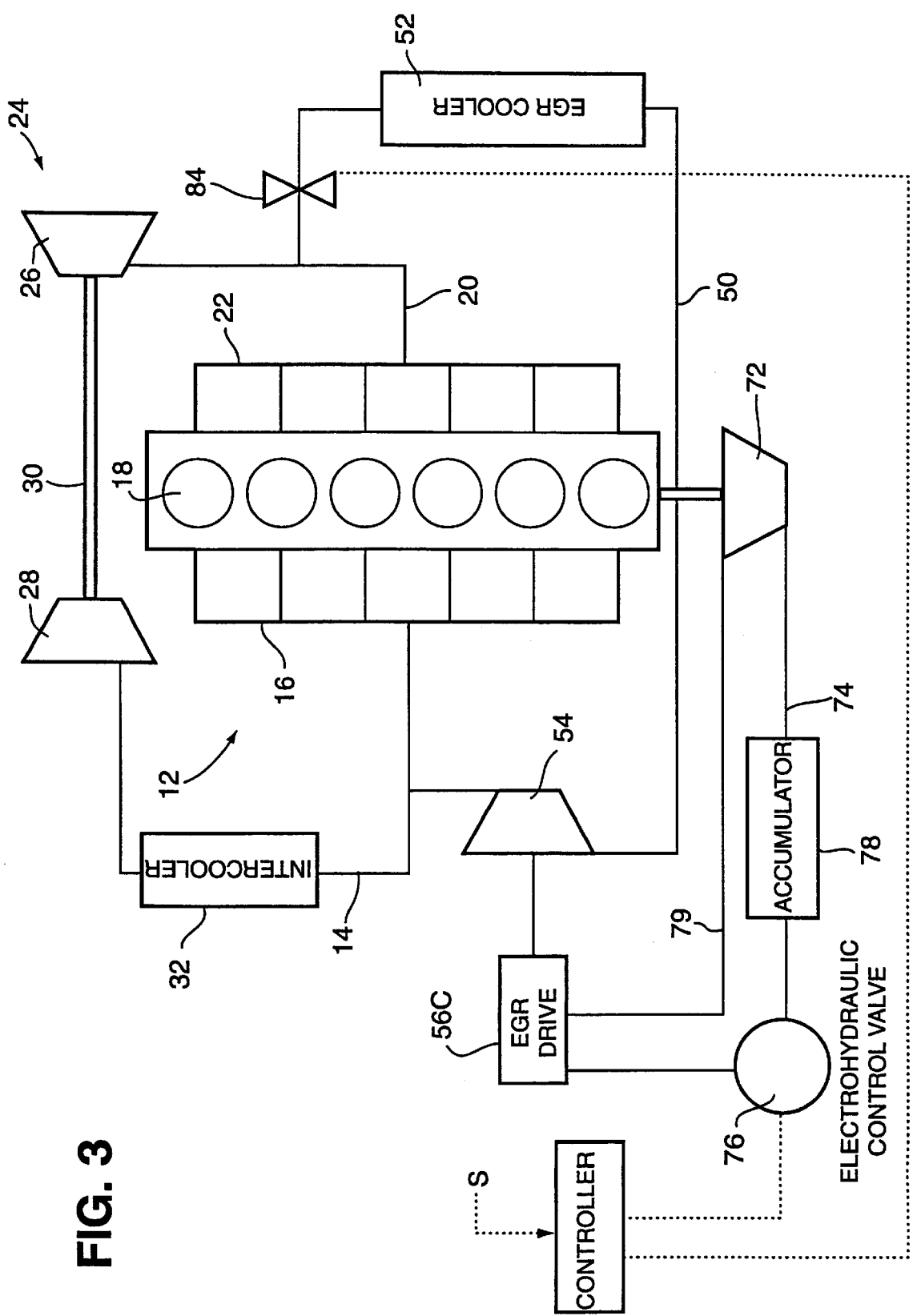
FIG. 3 is a schematic view of an EGR system constructed according to teachings of the invention having an EGR drive which is a hydraulic motor.
Figure 4:
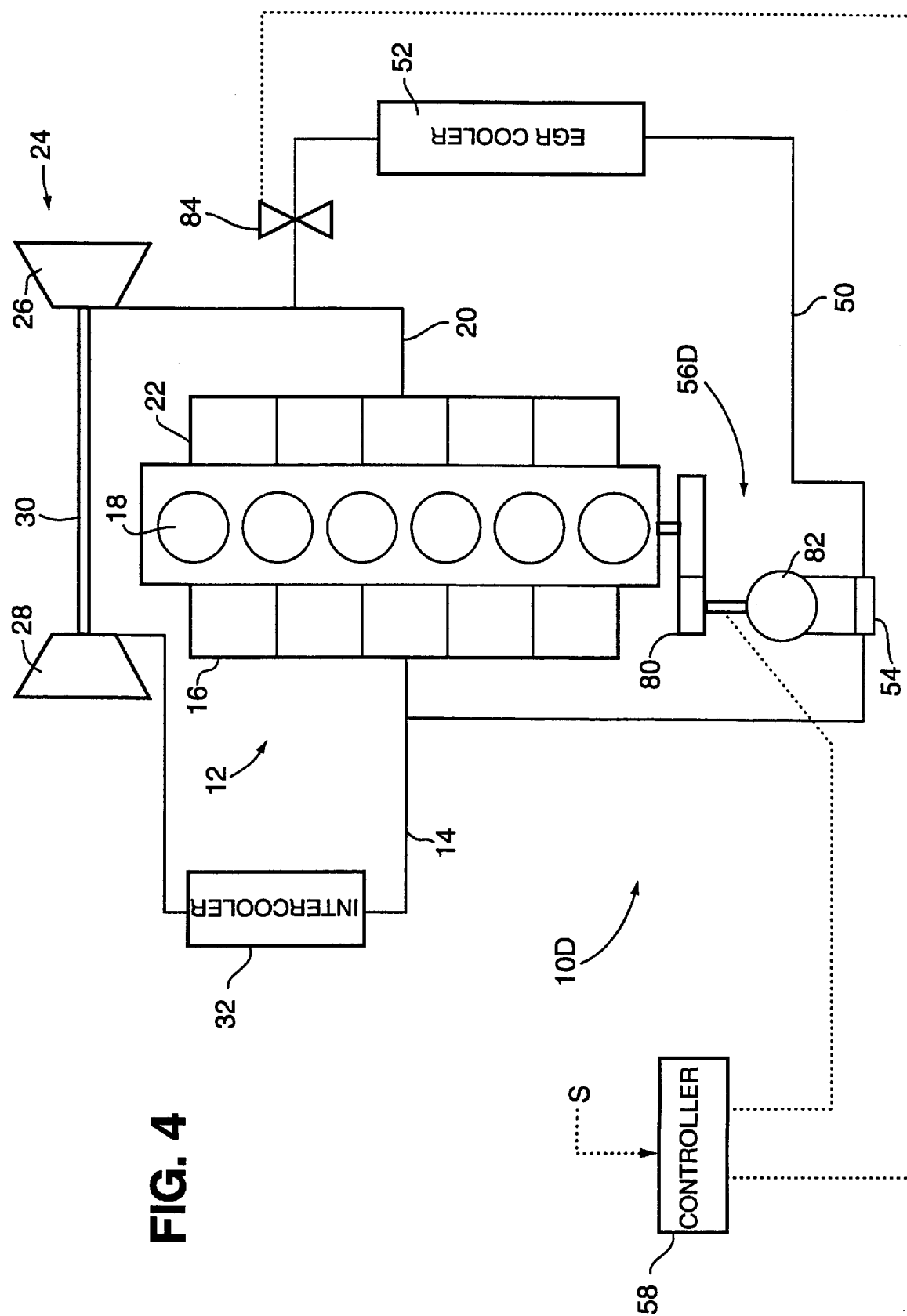
FIG. 4 is a schematic view of an EGR system constructed according to teachings of the invention having an EGR drive which is a variable-ratio coupling between the engine crankshaft and the EGR compressor.

In the embodiment shown in FIG. 3, the EGR drive 56C is a hydraulic motor powered by a hydraulic fluid medium, such as pressurized lube oil, or fuel. Accordingly, a drive fluid compressor 72 is provided to supply this hydraulic fluid medium through a hydraulic duct 74. In order to achieve a desired output of the EGR compressor, an electrohydraulic control valve 76 is located in the hydraulic duct 74 to modulate the rate of hydraulic fluid flow supplied to the EGR drive 56C in response to a signal from the controller 58. Additionally, a hydraulic fluid accumulator 78 is preferably located in the hydraulic duct 74. A return conduit 79 is provided to return hydraulic fluid from the EGR drive 56C to the drive fluid compressor 72.

In the embodiment shown in FIG. 4, the EGR drive 56D is a coupling to a crankshaft of the engine 12. Rotational power is transferred from the crankshaft through an appropriate means, such as a belt, chain, or gears 80, and then is transferred to the EGR compressor 54 through an appropriate transmission means, or more specifically, a coupling 82 having a variable-ratio output. The coupling 82 may be a conventional magnetic or viscous variable coupling, and may be a variable coupling of the type known in the field of variable-speed fan drive technology. The rotational output of the transmission 82, and hence the rotational speed of the EGR compressor 54, is modulated in response to a control signal from the controller.

The EGR system 10A–D also includes an EGR shutoff valve 84 located in the EGR duct 50, preferably upstream of the EGR cooler 52. The EGR shutoff valve 84 is selectively operable to permit or block EGR flow. Under certain operating conditions wherein EGR is unnecessary or could potentially create adverse effects to the engine, the controller 58 delivers a signal which actuates the EGR shutoff valve 84 to turn off the EGR flow. For example, the shut off valve 84 may be actuated to close during high transient torque demand situations, shutting off flow through the EGR duct 50.

The EGR compressor 54 discussed above in connection with FIGS. 1–4 may be any suitable compressor, but preferably is a positive displacement type of pump that repeatedly positively displaces discrete volumes of the exhaust gas in the EGR duct. For example, the EGR compressor may be, in specific embodiments, the EGR compressor 54' illustrated in FIGS. 5 and 6 or the EGR compressor 54" illustrated in FIG. 7.

Figure 5:
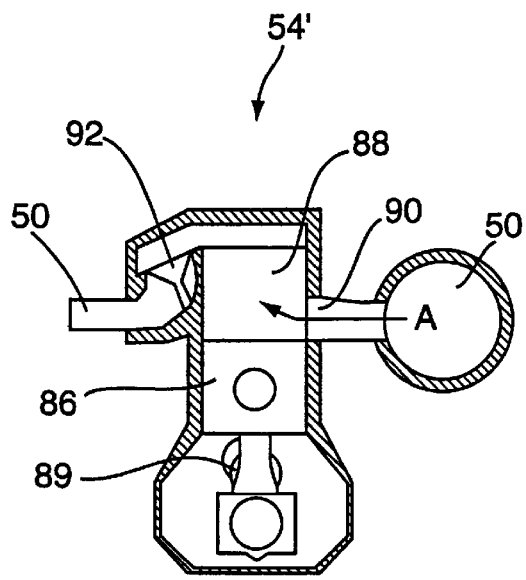
FIGS. 5 and 6 are sectional schematic views of a two-stroke piston-type EGR compressor according to an embodiment of the invention.
Figure 6:
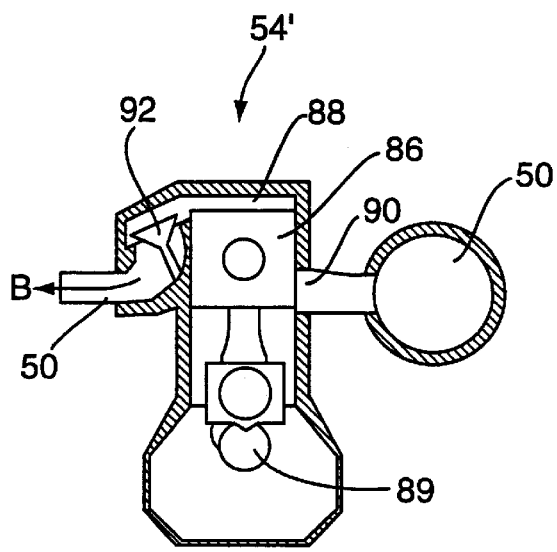

Referring to FIGS. 5 and 6, the EGR compressor 54' is a piston pump having a piston 86 driven to reciprocate within a cylinder 88 on a crank 89, which in turn is powered by the EGR drive 56A, 56B, 56C, or 56D (FIGS. 1–4, respectively). The EGR compressor 54' includes an inlet port 90 which, as illustrated in FIG. 5, temporarily opens at a bottom of the piston stroke to receive the EGR flow into the cylinder 88 (indicated by arrow A) from a segment of the EGR duct 50 that leads from the EGR cooler 52 (FIGS. 1–4). As illustrated in FIG. 6, An outlet valve 92 located generally at a top of the cylinder 88 opens as the piston approaches a top its stroke, releasing the compressed volume of exhaust gas (indicated by arrow B) into a segment of the EGR duct 50 that leads to the intake 14 (FIGS. 1–4). Of course, embodiments are possible in which the EGR compressor 54' has multiple pistons and cylinders.

Figure 7:
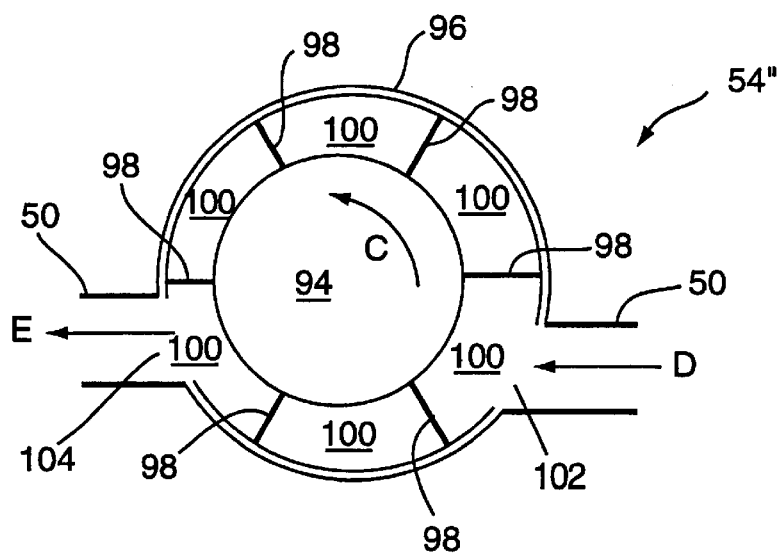
FIG. 7 is a schematic sectional view of a rotary vane type EGR compressor according to an embodiment of the invention.

Another type of discrete displacement pump suitable to serve compress the EGR gas is a rotary vane pump 54", such as that illustrated in FIG. 7. As generally known, the vane pump 54" has a rotor 94 which is rotatably mounted in an eccentric manner within a pumping chamber defined by a housing 96. The rotor 94 is driven to rotate by the dedicated EGR drive 56A–D (FIGS. 1–4) in the direction indicated by arrow C. A plurality of reciprocable vanes 98 are mounted to move rotatably with the rotor 94 in a generally radial orientation, but in a manner in which the vanes are radially slidable. In a known manner, a camming action causes the individual vanes 98 to pass closely to the housing 96 as the rotor 98 rotates. Thereby, a plurality of discrete pumping cavities 100 are formed between adjacent vanes 98.

The vane pump housing 96 has an inlet port 102 and an outlet port 104 in communication with segments of the EGR duct 50 respectively leading from the exhaust duct and to the intake duct of the engine. Because of the eccentric manner in which the rotor 98 is mounted within the housing 96, each cavity 100 has a maximum volume while passing the inlet port 102 and a minimum volume while passing the outlet port 104. This pulls EGR flow into the cavities through the inlet port 102 as indicated by arrow D and forces EGR flow out through the outlet port 104 as indicated by arrow E, resulting in a pumping action of EGR flow through the EGR duct 50 toward the intake duct 14.

It is noted that each of the positive displacement pumps 54' (FIGS. 5 and 6) and 54" (FIG. 7) discussed herein also function as an active valve, permitting only one-way EGR flow through the EGR duct 50 toward the intake duct 14. The compressor 54 could also be another type of positive-displacement pump, such as a screw compressor (not shown) or another equivalent compressor. Moreover, in keeping with the invention, the EGR compressor may also be a non-positive displacement type of pump operated in the independently driven and controlled manner of the invention, such as a fan or blower type compressor (not shown), preferably in conjunction with the shut-off valve 58.

The various embodiments of the EGR system 10A, 10B, 10C, and 10D according to the invention draw exhaust gas from the exhaust duct 50 upstream of the turbine 26 in order to minimize a pressure differential to be overcome by the EGR compressor 54. In order to further utilize the exhaust pressure to optimize EGR efficiency, the embodiments of the EGR system 10A, 10B, 10C, or 10D (FIGS. 1–4) according the invention may also be operated in a pulse-capture mode to take advantage of normal exhaust pressure pulses occurring in the exhaust duct 50 from the repeated exhaust strokes of the cylinders 18. In particular, in an embodiment, the EGR compressor 54 can be driven in a controlled mode wherein a discrete intake of the EGR compressor 54 occurs synchronously with the regular exhaust pulses, optimizing the effective pressure differential across the EGR compressor 54. In such an embodiment, the input signals S delivered to the EGR controller 58 includes an appropriate timing or position signal corresponding to a stroke position signal of the EGR compressor 54, and also an appropriate signal corresponding to the timing, position or exhaust pressure of the engine 12. A sensor (not shown) may be provided on the EGR compressor 54 to provide such a signal.

In a straight six-cylinder engine, such as the engine 12 illustrated in FIGS. 1–4, one exhaust pulse is emitted into the exhaust manifold per each 120° of crankshaft revolution. Accordingly, in a single piston EGR compressor 54', such as that illustrated in FIGS. 5 and 6, with a six-cylinder engine 12, the EGR compressor 54' is preferably operated at three times the engine RPM in the synchronous manner described in order to optimally capture each exhaust pulse. Of course, the relative driving speed of the pump will be varied in order to achieve the desired synchronous timing depending on the number of cylinders in the pump and the engine. The rotary vane type EGR compressor 54" of FIG. 8 may be operated in a pulse-capture mode also, by driving the rotor at an appropriate RPM such that one of the pumping cavities is passing the inlet port 102 synchronously with the exhaust pulses communicated to the inlet port 102.

Advantageously, in the arrangement of the EGR system 10A–D of the invention, a pressure ratio across the EGR compressor 54 to be overcome is about 1.15–1.25. This is relatively low in comparison to a pressure ratio of three or greater typically present in prior art systems which divert recirculated exhaust gas from an exhaust stack downstream of the exhaust turbine.

Experimental testing on a six-cylinder diesel engine providing 375 hp at 1500 rpm revealed that an EGR delivery system constructed in accordance with the invention required only 5 hp to deliver 15% EGR from the exhaust manifold to the intake manifold. Such performance will generally meet stricter emission requirements presently expected under future regulations to be implemented in the years 2002–2004. Assuming an EGR compressor efficiency of 60% and a mechanical drive system efficiency of 80%, a needed EGR compression ratio is only about 1.20. These results reflect the operation of cooling the EGR gas by with EGR cooler 52 before being drawn into the EGR compressor in order to minimize work of the EGR compressor 54.

While the invention is described herein in connection with certain preferred embodiments, there is no intent to limit it to those embodiments. On the contrary, it is recognized that various changes and modifications to the described embodiments will apparent to those skilled in the art, and that such changes and modifications may be made without departing from the spirit and scope of the present invention. Accordingly, the intent is to cover all alternatives, modifications, and equivalents included within the spirit and scope of the invention as defined by the appended claims.

What is claimed is:

1. An internal combustion engine having an intake duct, an exhaust duct, and an exhaust gas recirculation system comprising:

an EGR duct guiding an EGR flow of exhaust gas from the exhaust duct to the intake duct;

an EGR cooler located in the EGR duct cooling the EGR flow;

an EGR compressor located downstream of the EGR cooler pumping the EGR flow through the EGR duct;

an independent EGR drive positively driving the EGR compressor; and a controller modulating power delivery to the independent EGR drive to adjustably achieve a desired output of the EGR compressor in response to input signals corresponding to at least one engine operating parameter;

wherein the independent EGR drive is an electric motor.

2. An engine according to claim 1, the system further comprising:

a motor control circuit actuatable by said controller to modulate electric power to said electric motor.

3. An engine according to claim 1 further comprising:

a shut-off valve located in the EGR duct operable to selectively permit or block the EGR flow;

wherein the controller actuates the shut-off valve to turn off EGR delivery under predetermined conditions.

4. An engine according to claim 3, wherein said shut-off valve is located upstream of the EGR cooler.

5. An exhaust gas recirculation delivery and control system comprising:

an exhaust duct directing a flow of exhaust gas to drive a turbine;

an intake duct directing intake air from an intake compressor driven by the turbine through an intercooler;

an EGR duct guiding an EGR flow of exhaust gas from the exhaust duct at a position upstream of the turbine to the intake duct at a position downstream of the intake compressor and intercooler;

an EGR cooler located in the EGR duct cooling the EGR flow;

an EGR compressor located downstream of the EGR cooler pumping the EGR flow through the EGR duct;

an independent EGR drive operably coupled to drive the EGR compressor; and a controller modulating power delivery to the independent EGR drive to achieve a desired rate of flow through the EGR duct;

wherein said drive is an electric motor.

6. An exhaust gas recirculation delivery and control system according to claim 5, wherein said controller determines and adjusts power delivery to said independent drive in response to signals corresponding to at least one engine operating parameter.

7. An exhaust gas recirculation and delivery and control system according to claim 5, further comprising:

a motor control circuit actuatable by said controller to modulate electric power to said electric motor.

8. An EGR delivery and control system according to claim 5 further comprising:

a shut-off valve located in the EGR duct operable to selectively permit or block the EGR flow;

wherein the controller actuates the shut-off valve to turn off EGR delivery under predetermined conditions.

9. An exhaust gas recirculation delivery and control system according to claim 5, wherein said EGR compressor is a rotary vane pump having a plurality of circulating vanes with a plurality of pumping chambers respectively formed between adjacent pairs of the vanes, each of the pumping chambers circulating past an inlet port in communication with the EGR duct.

10. An exhaust gas recirculation delivery and control system according to claim 9, wherein the controller causes the drive to rotate the vanes of the vane pump in synchronism with exhaust pulses of the engine so that each of the pumping chambers passes the inlet in synchronism with periodic pulses of exhaust gas in the EGR duct.

11. An exhaust gas recirculation delivery and control system according to claim 5, wherein said EGR compressor repeatedly displaces discrete volumes of said EGR flow through said EGR duct.

12. An exhaust gas recirculation delivery and control system according to claim 11, wherein each of said discrete volumes is taken into said EGR compressor simultaneously with an exhaust pulse of the engine.

13. An exhaust gas recirculation delivery and control system according to claim 12, wherein said EGR compressor is a piston pump including:

a cylinder;

a piston which is driven by said EGR drive to reciprocate on a stroke within said cylinder;

an inlet port which temporarily opens at a bottom of the stroke to receive the exhaust gas into the cylinder from a segment of the EGR duct; and an exhaust valve which temporarily opens on a top of the stroke to release the exhaust gas into another segment of the EGR duct.

14. An exhaust gas recirculation delivery and control system according to claim 13, wherein the controller modulates the EGR drive to drive the EGR compressor such that the inlet port of the EGR compressor opens in synchronism with exhaust pulses of the engine.

* * * * *